United States Patent [19]
Watanabe

[11] Patent Number: 6,125,174
[45] Date of Patent: Sep. 26, 2000

[54] COMMUNICATION APPARATUS

[75] Inventor: Takashi Watanabe, Tokyo, Japan

[73] Assignee: Kabushiki Kaisha Toshiba, Kawasaki, Japan

[21] Appl. No.: 09/209,416

[22] Filed: Dec. 11, 1998

[30] Foreign Application Priority Data

Dec. 19, 1997 [JP] Japan .................................. 9-350333

[51] Int. Cl.[7] .............................. H04M 1/56; H04M 1/00
[52] U.S. Cl. ........................ 379/142; 379/157; 379/355; 379/356; 455/414
[58] Field of Search .................................. 379/142, 143, 379/121, 122, 127, 130, 155, 157, 164, 173, 179, 183, 187, 93.17, 93.23, 352, 354, 355, 356, 372, 373, 376; 455/414, 415

[56] References Cited

U.S. PATENT DOCUMENTS

| | | | |
|---|---|---|---|
| 5,412,711 | 5/1995 | Hayashi | 379/142 |
| 5,497,414 | 3/1996 | Bartholomew | 379/142 |
| 5,588,049 | 12/1996 | Detering et al. | 379/142 |
| 5,590,184 | 12/1996 | London | 379/142 |
| 5,719,929 | 2/1998 | Menard | 379/216 |
| 5,864,612 | 1/1999 | Strauss et al. | 379/142 |
| 5,901,207 | 5/1999 | Pickeral | 379/127 |

FOREIGN PATENT DOCUMENTS

| | | | |
|---|---|---|---|
| 0252 680 A2 | 7/1987 | European Pat. Off. | H04M 1/66 |
| 8-331233 | 12/1996 | Japan . | |
| WO 97/22217 A1 | 6/1997 | WIPO | H04Q 7/22 |

*Primary Examiner*—Huyen Le
*Assistant Examiner*—Binh K. Tieu
*Attorney, Agent, or Firm*—Finnegan, Henderson, Farabow, Garrett & Dunner, L.L.P.

[57] ABSTRACT

Abbreviated dial number table and special number table are provided in external memory in control unit of digital button telephone system. For each of abbreviated dial numbers, the abbreviated dial number table stores a destination phone number prefixed with a special number concerning whether notice of a call originating party identification number should be permitted. For each of destination identification numbers, the special number table stores the special number. At call origination, it is determined whether dial data is an identification number of destination or an abbreviated dial number. If the dial data is an abbreviated dial number, reference to the abbreviated dial number table is made, dial data prefixed with the special number according to the destination is read out, and sent to the trunk line. If the dial data is an identification number of destination, reference to the special number table is made, the special number registered in the table is added to the identification number of destination, and resultant dial data is sent to the trunk line. In both the case, it becomes unnecessary to determine whether notice of the call originating phone number should be permitted according to the destination, and accordingly adding the special number as occasion demands before dialing the identification number of destination.

17 Claims, 7 Drawing Sheets

| ABBREVIATED DIAL NUMBER | PHONE NUMBER | SPECIAL NUMBER |
|---|---|---|
| 01 | 0123111111 | 184 |
| 02 | 0331111111 | 186 |
| : | : | : |

FOR EXT. #1
FOR EXT. #2
FOR EXT. #m

FIG. 9

COMMUNICATION APPARATUS

BACKGROUND OF THE INVENTION

The present invention relates to a communication apparatus, and in particular to transmission control of dial data at the time of call origination in a communication apparatus connected to a communication network having a call originating phone number notice or display service function.

This application is based on Japanese Patent Application No. 9-350333, filed Dec. 19, 1997, the content of which is incorporated herein by reference.

In existing analog telephone networks, a call originating phone number notice service has been started in which a call originating phone number is noticed to a called subscriber and displayed on a telephone set of the called subscriber. In this service, a determination about whether notice of the call originating phone number may be permitted depends on the desire of the call originating subscriber. Therefore, if a call originating subscriber who conducted beforehand such a registration as to prevent, in principle, notice of the call originating phone number from being sent dials a destination phone number as it is, therefore, the call originating phone number is not noticed according to the principle. If the call originating subscriber adds a special number "186" before dialing the destination phone number, however, the call originating phone number is noticed only at the time of call origination of this dialing. Even if a call originating subscriber who has conducted beforehand such a registration as to prevent, in principle, notice of the call originating phone number from being sent adds a special number "184" before dialing the destination phone number, the call originating phone number is not noticed.

On the other hand, if a call originating subscriber who conducted beforehand such a registration as to send, in principle, notice of the call originating phone number dials a destination phone number as it is, the call originating phone number is noticed according to the principle. If the call originating subscriber adds the special number "184" before dialing the destination phone number, however, the call originating phone number is not noticed only at the time of call origination of this dialing. Even if a call originating subscriber who conducted beforehand such a registration as to send, in principle, notice of the call originating subscriber adds the special number "186" before dialing the destination phone number, the call originating phone number is noticed.

When a subscriber originates a call by dialing from a telephone set connected to a telephone network having such a call originating phone number notice or display service function, the call originating subscriber must determine according to the destination timely whether the call originating phone number should be noticed or not and accordingly add the special number such as "184" or "186" as occasion demands before dialing the destination phone number.

In order to omit such a labor, a communication apparatus described in JP-A-8-331233 has been proposed. This apparatus includes a call originating phone number memory and a phone number memory. The call originating phone number memory stores call originating phone numbers sequentially in the case where the call originating phone numbers are noticed when the calls have arrived. The phone number memory stores phone numbers inputted from a ten key, and call originating phone number notice flags respectively associated with the phone numbers to identify whether notice of each of the call originating phone numbers is permitted. As for methods of dialing, there are made possible manual call origination using the ten key, and automatic call origination of two kinds using one of phone numbers stored in the call originating phone number memory or the phone number memory. If a call is originated by using a phone number stored in the call originating phone number memory, then the possibility of the user permitting notice of the call originating phone number can be determined to be very high, and consequently notice of the call originating phone number in principle is set as a default. On the other hand, if a call is originated by using a phone number stored in the phone number memory, then it cannot be determined unconditionally whether notice of the call originating phone number is permitted, and consequently it is set as a default whether notice of the call originating phone number should be permitted in principle or should not be permitted in principle destination by destination on the basis of the call originating phone number notice flag stored in the phone number memory so as to be associated with each phone number. In the case of manual call origination as well, notice of the call originating phone number is permitted as a default. After dialing operation, it is displayed on the destination telephone set together with a phone number whether notice of the call originating phone number should be permitted or not is set as a default. If it is necessary to change the setting as to whether notice of the call originating phone number should be permitted, it can be altered in this stage. Thereafter, dial data is sent.

In this conventional technique as well, however, it is set only as a default whether notice of the call originating phone number should be permitted, and the dial data is not sent out automatically on the basis of the default setting. Although it becomes unnecessary to additionally dial the special number such as "184" or "186" as occasion demands before dialing the destination phone number, therefore, it remains necessary for the call originating subscriber to make a decision timely according to the destination as to whether notice of the call originating phone number should be permitted.

Furthermore, only for the phone numbers stored in the phone number memory, call originating phone number notice flags respectively associated with called phone numbers are stored. However, when originating a call toward a phone number stored in the call originating phone number memory or originating a call manually using the ten key, however, it is impossible to set whether notice of the call originating phone number should be permitted as a default for each destination.

BRIEF SUMMARY OF THE INVENTION

Accordingly, it is an object of the present invention to provide a communication apparatus connected to a communication network having a call originating phone number notice service function which can automatically send dial data accompanied by a special number concerning whether notice of a call originating phone number should be permitted, predetermined in association with each destination phone number, at the time of call origination to the communication network.

In accordance with the present invention, a communication apparatus connected to a communication network having a function of noticing of an identification number of a call originating party to a called party comprises storage means for storing information concerning whether notice of an identification number of a call originating party should be permitted, for each destination, and control means, responsive to input of dial information at time of call origination, for identifying destination on the basis of the dial information, reading out information concerning whether notice of an identification number of a call originating party should be permitted, for the destination from the storage means, and sending dial information containing the information thus read out.

According to the present invention, it is possible to add information concerning whether notice of the call originating phone number should be permitted according to previously set individual destination and send dial data, at the time of call origination to the communication network. Therefore, such an operation as to confirm whether notice of the call originating phone number should be permitted and add the special number every call origination is mitigated.

The storage means comprises a table for storing information concerning whether notice of an identification number of a call originating party should be permitted or not, and an identification number, for each abbreviated dial number.

This table stores an identification number accompanied by information concerning whether notice of an identification number of a call originating party should be permitted or not, for each abbreviated dial number. The control means sends an identification number accompanied by information concerning whether notice of an identification number of a call originating party should be permitted or not, read out from the table.

The storage means comprises a table for storing either a first special number indicating that notice of an identification number of a call originating party should be permitted to the destination, or a second special number indicating that notice of an identification number of a call originating party should not be permitted to the destination, and an identification number. The control means sends out dial information containing an identification number accompanied by either the first special number or the second special number, read out from the table.

The storage means includes a table for storing information concerning whether notice of an identification number of a call originating party should be permitted or not, for each identification number of destination.

The storage means includes a table for storing either a first special number indicating that notice of an identification number of a call originating party should be permitted to the destination, or a second special number indicating that notice of an identification number of a call originating party should not be permitted to the destination, for each identification number of destination. The control means sends out dial information containing an identification number accompanied by either the first special number or the second special number, read out from the table.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of a communication apparatus according to the present invention will now be described with reference to the accompanying drawings.

First Embodiment

Figure 1:
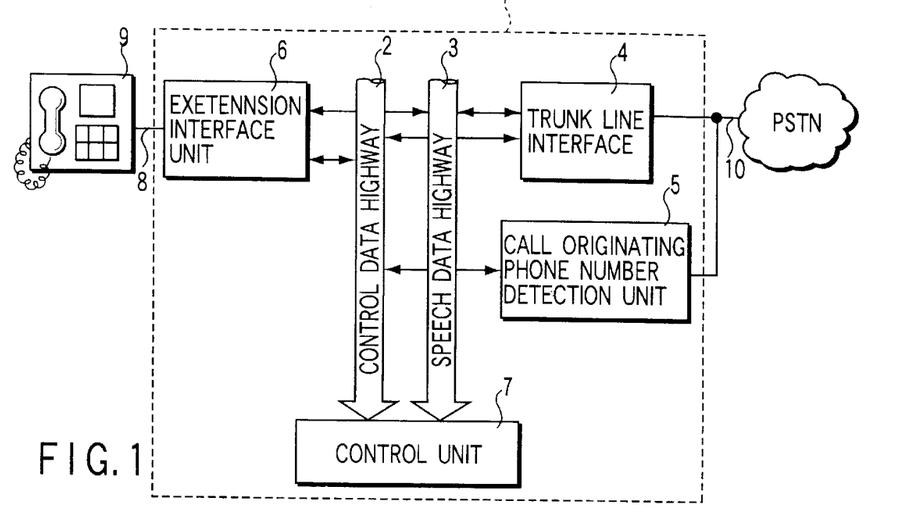
FIG. 1 is a block diagram showing the configuration of a first embodiment in which the present invention has been applied to a digital key telephone system.

FIG. 1 shows the configuration of a first embodiment. A digital key telephone main apparatus 1 includes a control unit 7 for controlling call processing of various control signals, various speech signal interface units 4, 5 and 6, a control data highway 2 for transmission and reception of control data between these units, and a speech data highway 3 for transmission and reception of PCM coded speech data between these units. A trunk line interface unit 4, and a call originating phone number detection unit 5 for receiving and demodulating modulated signals of a call originating phone number and so on sent from an exchange are connected in parallel to an office exchange (not illustrated) of a public telecommunication network 11 having a call originating phone number notice service function via a trunk line 10. An extension interface unit 6 is connected to an extension telephone set 9 having a LCD display unit for displaying a call originating phone number and so on via an extension line 8.

Figure 2:
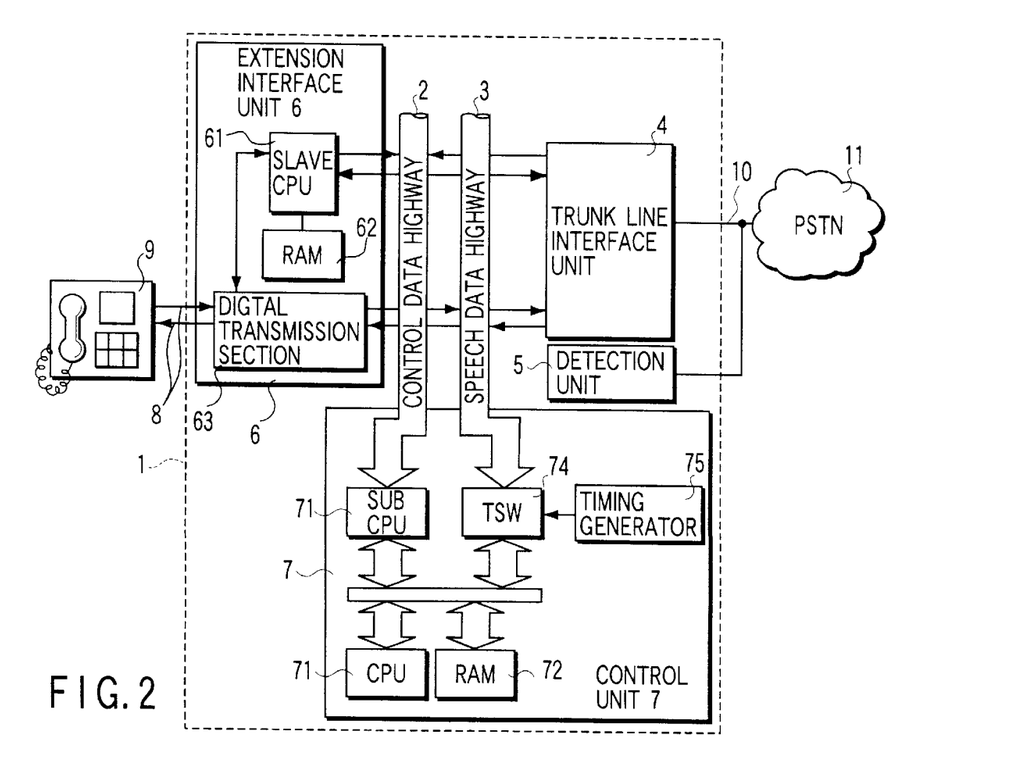
FIG. 2 is a block diagram showing further detailed configurations of an extension interface unit and a control unit in the first embodiment.

FIG. 2 is a block diagram showing further detailed configurations of the extension interface unit 6 and the control unit 7. The extension interface unit 6 includes a slave CPU 61 for controlling transmission and reception of control signals via the data highway 2, an external memory (RAM) 62 for the slave CPU 61, and a digital transmission section 63 for controlling transmission and reception of control signals and speech data between the extension telephone set 9 and the main apparatus 1. The control unit 7 includes a CPU 71 for controlling the whole call processing of the digital key telephone main apparatus 1, an external memory (RAM) 72 for storing an abbreviated dial number table and a special number table, a sub CPU 73 corresponding to the slave CPU 61 and controlling transmission and reception of control signals, a time switch circuit (TSW) 74 for exchanging speech signals, and a timing generator 75 for generating various timing signals.

Figure 3:
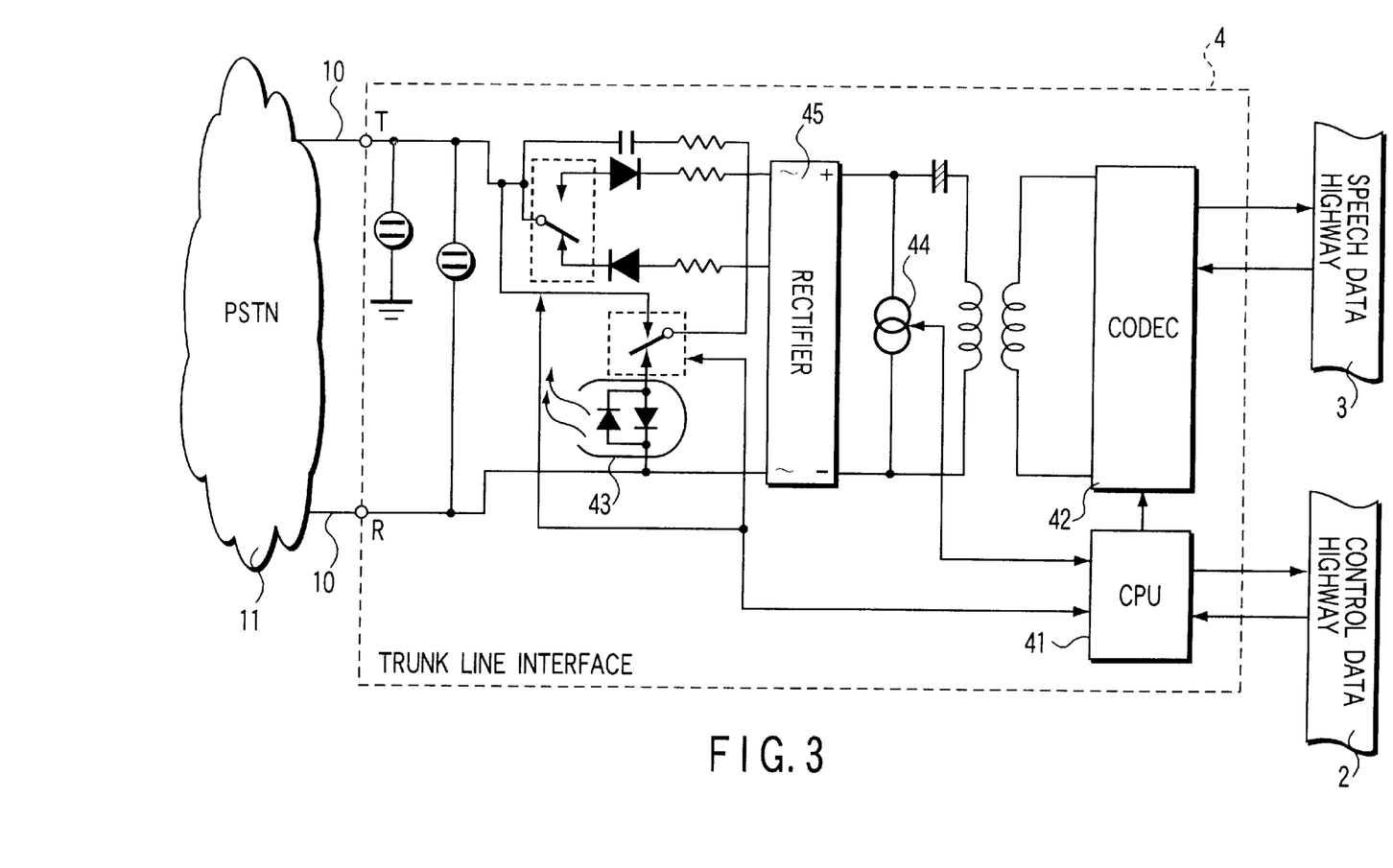
FIG. 3 is a diagram showing a further detailed configuration of a trunk line interface in the first embodiment.

FIG. 3 is a diagram showing a more detailed configuration of the trunk line interface unit 4. The trunk line interface unit 4 includes a CPU 41, a CODEC 42, a call arrival and polarity inversion detector 43, a DC current controller 44, and a rectifier 45. The CPU 41 controls call arrival detection, polarity inversion detection, line seizure, dial sending, and so on in the trunk line interface unit 4. The CODEC 42 conducts PCM coding and decoding of speech signals. As many CODECs 42, call arrival and polarity inversion detectors 43, DC current controllers 44, and rectifiers 45 as the number of the trunk lines 10 are provided. The trunk line interface unit 4 having such a configuration conducts operations such as detection of call arrival from the trunk line 10, the polarity inversion detection, the line seizure, and dial sending to the trunk line 10.

Figure 4:
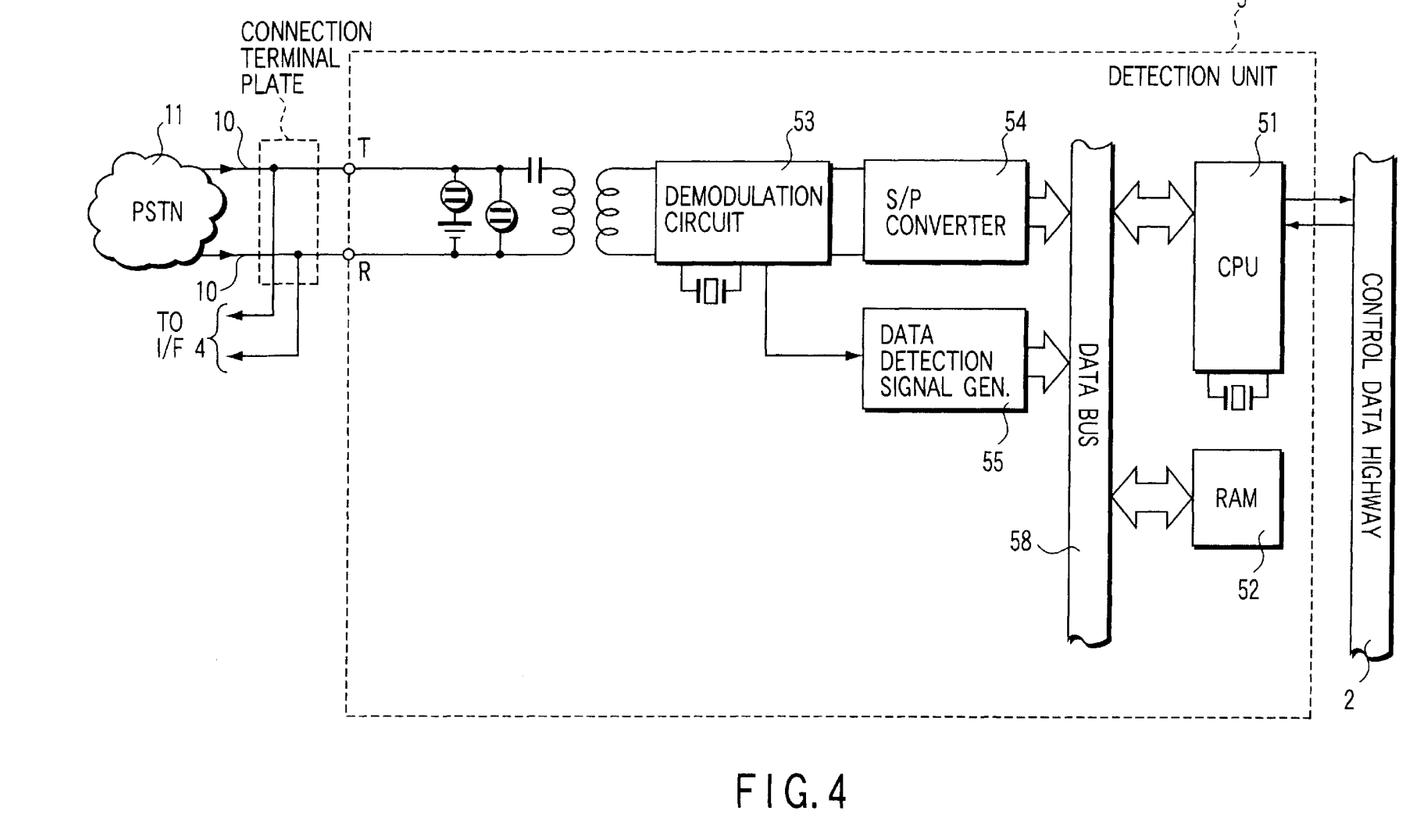
FIG. 4 is a diagram showing a further detailed configuration of a call originating phone number detection unit in the first embodiment.

FIG. 4 is a diagram showing a more detailed configuration of the call originating phone number detection unit 5. The call originating phone number detection unit 5 includes a CPU 51, an external memory (RAM) 52 of the CPU 51, a demodulation circuit 53, a serial to parallel (S/P) converter 54, a data detection signal generator 55, and a data bus 58. The CPU 51 controls the call originating phone number detection unit 5. The demodulation circuit 53 demodulates a signal indicating a call originating phone number sent from the office exchange via the trunk line 10. The S/P converter 54 conducts serial/parallel conversion of received data sent from the demodulation circuit 53. The data detection signal generator 55 sends a data detection signal sent from the demodulation circuit to give notice of arrival of received data. As many demodulation circuits 53, S/P converters 54, data detection signal generators 55, and so on as the number of trunk lines 10 are provided. The call originating phone number detection unit 5 detects a call originating phone number from a signal arriving from the trunk line 10 at the time of call origination, and conducts operation for sending out a signal to display the detected call originating phone number on a LCD display unit of the extension telephone set 9.

Operation of the first embodiment will now be described. In this embodiment, an abbreviated dial number table and a special number table are provided in the external memory 72 for each extension telephone set 9. For each of abbreviated dial numbers, the abbreviated dial number table stores a destination phone number prefixed with the special number indicating whether notice of the call originating number should be permitted. For each of destination phone numbers, the special number table stores the special number. If an abbreviated dial number or a destination phone number is dialed from the extension telephone set 9, then reference to the abbreviated dial number table or the special number table is made on the basis of this dial data. Dial data preceded by the special number indicating whether notice of the call originating phone number should be permitted according to the destination is sent out. In other words, in the first embodiment, there is no distinction such as whether notice of the call originating phone number should be permitted in principle or should not be permitted in principle, but it can be beforehand set for each destination phone number whether notice of the call originating phone number should be permitted.

If, in the ordinary digital key telephone system, the trunk line button, i.e., the so-called external line button is depressed and a destination phone number is dialed on the extension telephone set 9, the dial data is sent to the trunk line 10 as it is. For exercising the function of automatically adding the special number according to the present invention, therefore, the trunk line button is not depressed, but a number obtained by adding "0" before the destination phone number is dialed by depressing dial buttons. In the case of call origination using an abbreviated dial number, the function of automatically adding the special number can be exercised by depressing the trunk line button and dialing the abbreviated dial number.

Figure 5:
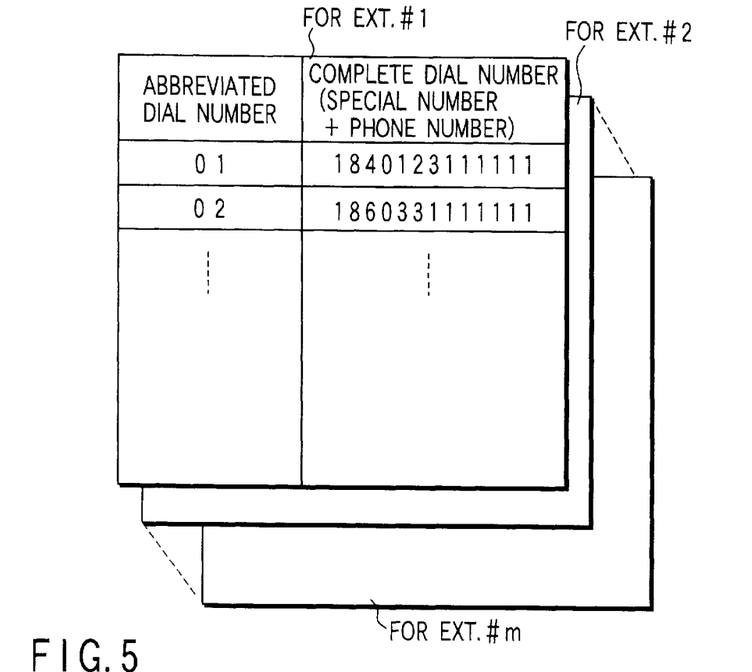
FIG. 5 is a diagram showing an example of an abbreviated dial number table in the first embodiment.
Figure 6:
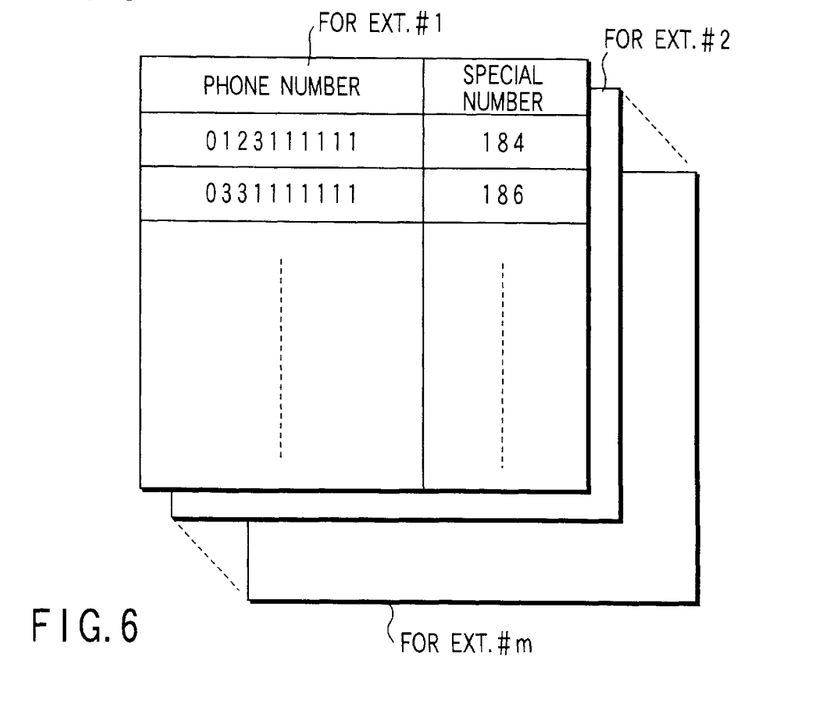
FIG. 6 is a diagram showing an example of a special number table in the first embodiment.

FIG. 5 shows an example of the abbreviated dial number table in the RAM 72. The abbreviated dial number table stores abbreviated dial numbers and complete dial numbers respectively associated with them. Each of the complete dial numbers is a destination phone number prefixed with the special number. FIG. 6 shows an example of the special number table in the RAM 72. The special number table stores destination phone numbers and the special numbers associated with them.

A method for registering data into the abbreviated dial number table (FIG. 5) will now be described. As for setting, into this table, a destination phone number prefixed with the special number indicating whether notice of the call originating phone number should be permitted, it may be conducted in accordance with the well-known abbreviated dial number setting procedure. The complete dial number is obtained by adding the special number indicating whether notice of the call originating phone number should be permitted, i.e., "186" or "184" before a destination phone number such as "1234567." In this case, "1861234567" or "1841234567", is inputted.

A method for setting the special number associated with a destination phone number into the special number table (FIG. 6) will now be described. By using dial buttons on the extension telephone set 9, a special code, such as "*99", for setting the special number indicating whether notice of the call originating phone number should be permitted, a destination phone number "xxxxxxx", the special number "*186" or "*184" indicating whether notice of the call originating phone number should be permitted, and a setting end code such as "##" are input in this order. Thus, for example, "*99xxxxxxx*186##" or "*99xxxxxxx*184##" is input.

This data is received by the CPU 71 in the control unit 7 via the extension interface unit 6 and the control data highway 2. As a result, the destination phone number and the special number associated therewith are registered in the special number table of the extension telephone set 9 in the RAM 72.

Figure 7:
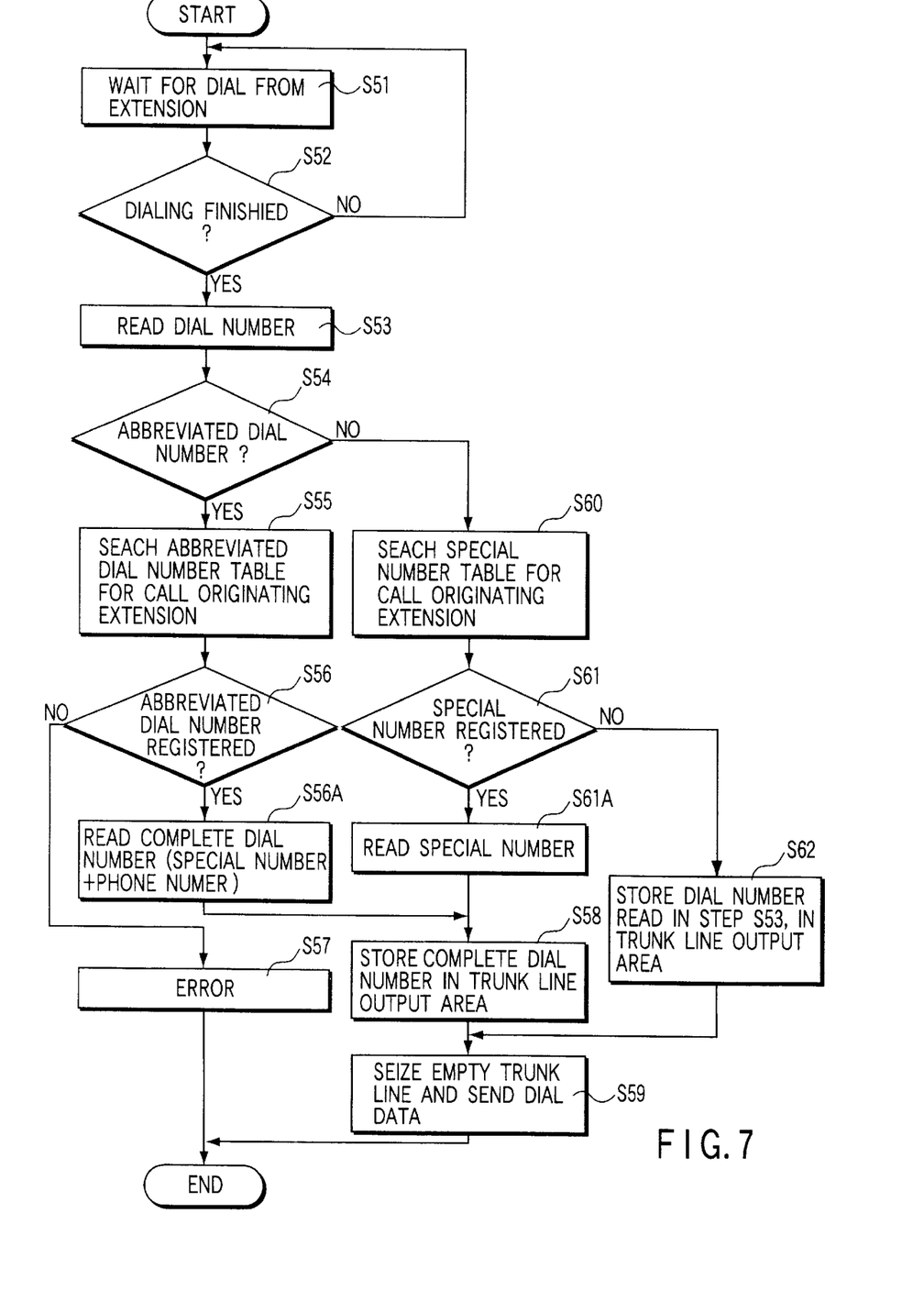
FIG. 7 is a flow chart showing a processing procedure in the first embodiment.

By referring to a flow chart of FIG. 7, a procedure of automatically adding the special number indicating whether notice of the call originating phone number should be permitted and sending dial data to the trunk line 10 will now be described.

In a standby state, depression of a dial button on the extension telephone set 9 is waited for at step S51. In the case where a dial number is sent to the trunk line 10, the call originating person conducts dialing operation by depressing dial buttons of the extension telephone set 9. Upon detecting at step S52 that the dialing operation has been finished, the CPU 71 of the control unit 7 reads and stores dial data at step S53. As for detecting that the dialing operation has been finished, the call originating person may depress a special button such as "*" or "start" after depressing dial buttons corresponding to a dial number. In this case, depression of the special button is detected in order to detect that the dialing operation has been finished. Alternatively, the dial operation may be determined to have been finished by detecting that a period of 2 to 3 seconds has elapsed without depression of the next dial button after consecutive depression operations of dial buttons.

After storing the read dial data in a predetermined area (step S53), the CPU 71 makes a decision at step S54 on whether the dial number is an abbreviated dial number. Here, "*01" is dialed. The abbreviated number is characterized in that it is a number of two digits, and preceded by "*." In other words, the CPU 71 determines whether "*" has been dialed first. If the CPU 71 determines the dial number to be an abbreviated dial number, then the CPU 71 searches the abbreviated dial number table (FIG. 5) associated with the call originating extension telephone set 9 and stored in the RAM 72 at step S55, and determines at step S56 whether a complete dial number (special number+destination phone number) associated with the abbreviated dial number has been registered in advance. If it has not been registered in advance, then the CPU 71 gives error notice at step S57 and the operation is ended.

If it has been registered in advance, then the CPU 71 reads the complete dial number (special number such as "184"+ destination phone number) associated with the abbreviated dial number at step S56A. Thus, the CPU 71 reads out, for example, "1841234567". At step S58, the CPU 71 stores the complete dial number (special number+destination phone number) in an area for sending it to the trunk line 10. Thereafter, the CPU 71 seizes an empty trunk line at step S59, and sends the complete dial number (special number+ destination phone number), such as, for example, "1841234567" stored in the area to the trunk line 10 via the trunk line interface unit 4. Accordingly, dial data obtained by adding the special number indicating whether notice of the call originating phone number should be permitted, to the destination phone number is automatically sent to the trunk line 10.

On the other hand, if the dial number is determined not to be an abbreviated dial number at the step S54, the CPU 71 searches the special number table (FIG. 6) associated with the call originating extension telephone set 9 and stored in the RAM 72 at step S60, and determines at step S61 whether the special number "184" or "186" associated with the destination phone number has been registered in advance. If it has been registered in advance, then the CPU 71 reads the special number at step S61A. At step S58, the CPU 71 stores a complete number obtained by adding the special number to the destination phone number, such as "1841234567", in an area for sending it to the trunk line 10. Thereafter, the CPU 71 seizes an empty trunk line at step S59, and sends the complete dial number (special number+destination phone number) stored in the area to the trunk line 10 via the trunk line interface unit 4. Accordingly, dial data obtained by adding the special number indicating whether notice of the call originating phone number should be permitted, to the destination phone number is automatically sent to the trunk line 10.

If the destination phone number is not stored in the special number table at the step S61, then the CPU 71 stores the destination phone number as it is read at the step S53 in the area for sending it to the trunk line 10 at step S62. Subsequently, the CPU 71 seizes an empty trunk line at step S59, and sends the stored dial data of the destination phone number to the trunk line 10 via the trunk line interface unit 4.

As described above, an abbreviated dial number table and the special number table are provided in the external memory 72 for each extension telephone set 9 in this embodiment. For each of abbreviated dial numbers, the abbreviated dial number table stores a destination phone number prefixed with the special number. For each of destination phone numbers, the special number table stores the special number. If an abbreviated dial number is dialed from the extension telephone set 9, then reference to the abbreviated dial number table is made on the basis of this dial data. Dial data having a destination phone number prefixed with the special number indicating whether notice of the call originating phone number should be permitted according to the destination is read out and sent to the trunk line 10. On the other hand, if a destination phone number is dialed from the extension telephone set 9, then reference to the special number table is made on the basis of this dial data. The special number indicating whether notice of the call originating phone number should be permitted registered in the table is added to the destination phone number. Resultant dial data is sent to the trunk line 10. By registering beforehand whether notice of the call originating phone number should be permitted for each destination in either of the tables, therefore, a suitable special number according to the destination is automatically added to the destination phone number, when originating a call by dialing from a telephone set connected to a telephone network having the call originating phone number notice service function. Therefore, it becomes unnecessary to determine whether notice of the call originating phone number should be permitted according to the destination, and accordingly additionally dialing the special number "184" or "186" as occasion demands before dialing the destination phone number.

Other embodiments of the communication apparatus according to the present invention will be described. The same portions as those of the first embodiment will be indicated in the same reference numerals and their detailed description will be omitted.

Second Embodiment

A second embodiment in which the present invention has been applied to an individual telephone system will now be described.

Figure 8:
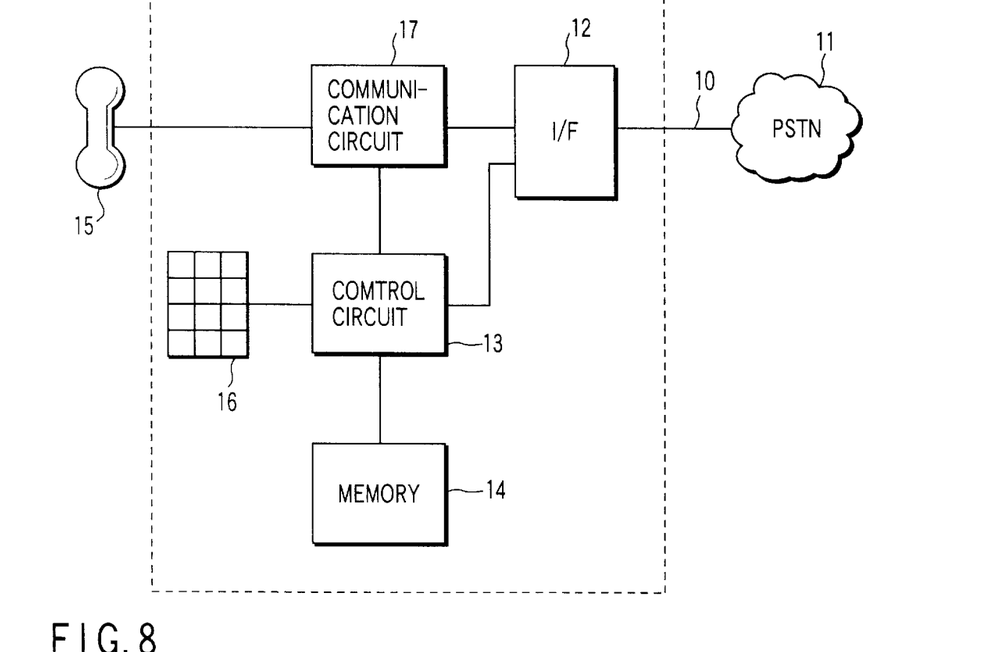
FIG. 8 is a block diagram showing the configuration of a second embodiment in which the present invention has been applied to an individual telephone system.

FIG. 8 shows the configuration of the second embodiment. A communication circuit 17 is connected to the trunk line 10 via an interface circuit (I/F) 12. A control circuit 13 is also connected to the communication circuit 17. An interface circuit (I/F) 12, an external memory 14, and dial buttons 16 are also connected to the control circuit 13. A handset 15 is connected to the communication circuit 17.

Operation of the second embodiment will now be described. In this embodiment as well, an abbreviated dial number table (FIG. 5: however, only one table for itself is provided in the second embodiment) and the special number table (FIG. 6: however, only one table for itself is provided in the second embodiment) are provided in the memory 14. For each of abbreviated dial numbers, the abbreviated dial number table stores a destination phone number, such as "1234567", prefixed with the special number "186" or "184". For each of destination phone numbers, the special number table stores the special number. If a destination phone number or an abbreviated dial number, such as "*01", is dialed from the dial buttons 16, then reference to the special number table or the abbreviated dial number table is made. Dial data preceded by the special number indicating whether notice of the call originating phone number should be permitted according to the destination is sent out. If the destination phone number is dialed according to an ordinary procedure, however, the dial data is sent as it is to the trunk line 10. For exercising the function of automatically adding the special number, therefore, a number obtained by adding a special code such as "#" before the destination number is dialed by depressing dial buttons. In the case of an abbreviated dial number, the function of automatically adding the special number can be exercised without adding a code such as "#" by dialing an abbreviated dial number.

Figure 9:
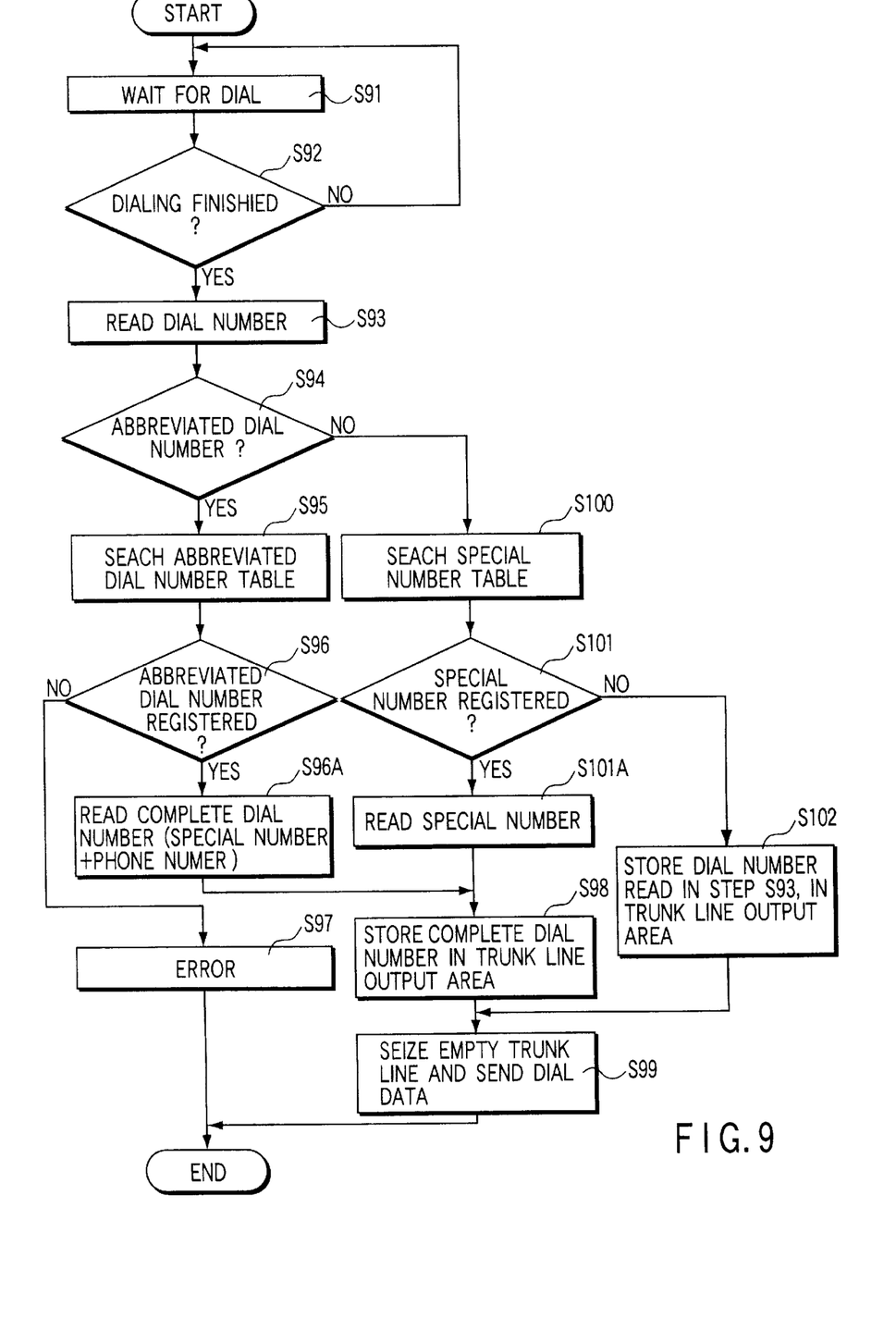
FIG. 9 is a flow chart showing a processing procedure in the second embodiment.

By referring to a flow chart of FIG. 9, a procedure of automatically adding the special number indicating whether notice of the call originating phone number should be permitted and sending dial data to the trunk line will now be described.

In a standby state, depression of dial buttons 16 is waited for at step S91. In the case where a dial number is sent to the trunk line 10, the call originating person conducts dialing operation by depressing dial buttons 16. Upon detecting at step S92 that the dialing operation has been finished, the control unit 13 reads and stores dial data at step S93. As for detecting that the dialing operation has been finished, the call originating person may depress a special button such as "*" or "start" after depressing dial buttons corresponding to a dial number. In this case, depression of the special button is detected in order to detect that the dialing operation has been finished. Alternatively, the dial operation may be determined to have been finished by detecting that a period of 2 to 3 seconds has elapsed without depression of the next dial button after consecutive depression operations of dial buttons.

After storing the read dial data in a predetermined area (step S93), the control circuit 13 makes a decision at step S94 on whether the dial number is an abbreviated dial number. Here, "*01" is dialed. The abbreviated number is characterized in that it is a number of two figures, and preceded by "*." In other words, the control circuit 13 determines whether "*" has been dialed first. If the control circuit 13 determines the dial number to be an abbreviated dial number, then the control circuit 13 searches the abbreviated dial number table (FIG. 5) stored in the memory 14 at step S95, and determines at step S96 whether a complete dial number (special number+ destination phone number) associated with the abbreviated dial number has been registered in advance. If it has not been registered in advance, then the control circuit 13 gives error notice at step S97 and the operation is finished.

If it has been registered in advance, then the control circuit 13 reads the complete dial number (special number such as "184"+destination phone number such as "1234567") associated with the abbreviated dial number at step S96A. At step S98, the control circuit 13 stores the complete dial number (special number+destination phone number) in an area for sending it to the trunk line 10. Thereafter, the control circuit 13 seizes an empty trunk line at step S99, and sends the complete dial number (special number+destination phone number), such as, for example, "1841234567" stored in the area to the trunk line 10 via the interface unit 12. Accordingly, dial data obtained by automatically adding the special number indicating whether notice of the call originating phone number should be permitted, to the destination phone number is sent to the trunk line 10.

On the other hand, if the dial number is determined not to be an abbreviated dial number at the step S94, the control circuit 13 searches the special number table (FIG. 6) stored in the memory 14 at step S100, and determines at step S101 whether the special number such as "184" associated with the destination phone number has been registered in advance. If it has been registered in advance, then the control circuit 13 reads the special number at step S101A. At step S98, the control circuit 13 stores a complete number obtained by adding the special number to the destination phone number in an area for sending it to the trunk line 10. Thereafter, the control circuit 13 seizes an empty trunk line at step S99, and sends the complete dial number (special number+destination phone number), such as "1841234567", stored in the area to the trunk line 10 via the interface circuit 12. Accordingly, dial data obtained by automatically adding the special number indicating whether notice of the call originating phone number should be permitted, to the destination phone number is sent to the trunk line 10.

If the destination phone number is not stored in the special number table at the step S101, then the control circuit 13 stores the destination phone number (as it is) read at the step S93 in the area for sending it to the trunk line 10 at step S102. Subsequently, the control circuit 13 seizes an empty trunk line at step S99, and sends the stored dial data of the destination phone number to the trunk line 10 via the interface circuit 12.

As heretofore described, an abbreviated dial number table and the special number table are provided in the external memory 14 for each extension telephone set in the second embodiment as well. For each of abbreviated dial numbers, the abbreviated dial number table stores a destination phone number prefixed with the special number. For each of destination phone numbers, the special number table stores the special number. If an abbreviated dial number is dialed from the dial buttons 16, then reference to the abbreviated dial number table is made on the basis of this dial data. Dial data having a destination phone number prefixed with the special number indicating whether notice of the call originating phone number should be permitted according to the destination is read out and sent to the trunk line 10. On the other hand, if a destination phone number is dialed from the dial buttons 16, then reference to the special number table is made on the basis of this dial data. The special number indicating whether notice of the call originating phone number should be permitted registered in the table is added to the destination phone number. Resultant dial data is sent to the trunk line 10. By registering beforehand in either of the tables, therefore, it becomes unnecessary to determine whether notice of the call originating phone number should be permitted according to the destination, and accordingly additionally dialing the special number "184" or "186" as occasion demands before dialing the destination phone number.

As for setting the special number associated with a destination phone number into the special number table or the abbreviated dial number table, it can be conducted in the same way as the first embodiment by using dial buttons 16.

Modifications

In the above described first and second embodiments, it is not registered whether notice of the call originating phone number should be permitted in principle or should not be permitted in principle. When setting whether notice of the call originating phone number should be permitted, in the abbreviated dial number table (FIG. 5), therefore, either the special number "184" indicating that notice of the call originating phone number should not be permitted or the special number "186" indicating that notice of the call originating phone number should be permitted is added before the destination phone number. However, it may be used together with the registration as to whether notice of the call originating phone number should be permitted in principle or should not be permitted in principle. In other words, in the case where it is registered that notice of the call originating phone number should not be permitted in principle, the special number "186" indicating that notice of the call originating phone number should be permitted may be added only before destination phone numbers whereto notice of the call originating phone number should be permitted, instead of adding the special number "184" before destination phone numbers whereto notice of the call originating phone number should not be permitted. On the contrary, in the case where it is registered that notice of the call originating phone number should be permitted in principle, the special number "184" may be added only before destination phone numbers whereto notice of the call originating phone number should not be permitted, instead of adding the special number "186" before destination phone numbers whereto notice of the call originating phone number should be permitted. By doing so, however, table correction is troublesome in the case where the principle registration is to be altered. Accordingly, registration of the special numbers indicating whether notice of the call originating phone number should be permitted or not in the table for each destination irrespective of the principle registration as in the first and second embodiments has a value in its own way.

Furthermore, in the above described first and second embodiments, the special number table and the abbreviated dial number table are provided separately. Alternatively, one of the tables may be omitted.

Figure 10:
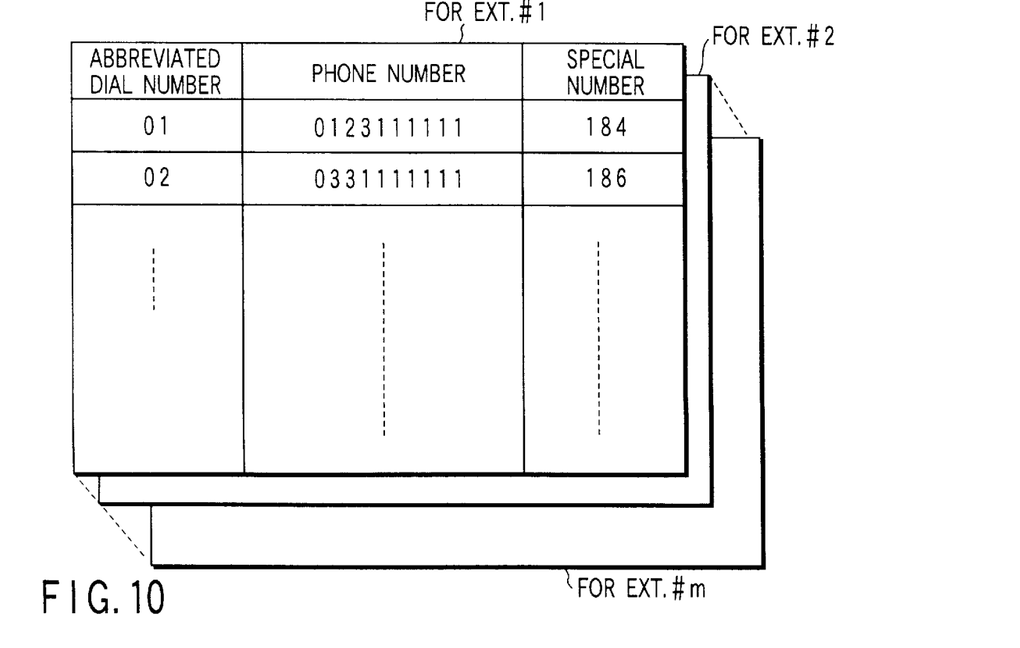
FIG. 10 is a diagram of a phone number table of a variant.

Furthermore, also in the case where the special number table and the abbreviated dial number table are provided separately, it is also possible to store the special numbers concerning whether the call originating phone number should be permitted or not, in the special number table, and store only destination phone numbers respectively associated with abbreviated dial numbers in the abbreviated dial number table in the same way as the ordinary abbreviated dial number table. In this case, it is also possible to search for the destination phone number by using the abbreviated dial number table, then search for the special number associated with the destination phone number, and add the special number to the destination phone number. In addition, it is also possible combine the two tables into one table as shown in FIG. 10.

As heretofore described, in the communication apparatus of the present invention, it is possible to add information concerning whether notice of the call originating phone number should be permitted or not according to previously set individual destination phone number and send dial data, at the time of call origination to the trunk line 10. Therefore, there is an advantage that such an operation as to confirm whether notice of the call originating phone number should be permitted or not and add the special number every call origination is mitigated. In addition, a suitable special number according to the destination can be automatically added no matter whether a call is originated by compacted dialing or manual dialing.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the above described embodiments have been described with respect to a button telephone system and an individual telephone system. However, the present invention can be applied to the private branch exchange, facsimile, portable telephone, PHS, and automobile telephone without departing from the spirit of the present invention.

What is claimed is:

1. A communication apparatus connected to a communication network having a function of noticing of an identification number of a call originating party to a called party, said communication apparatus comprising:

storage means for storing information concerning whether notice of the identification number of the call originating party should be permitted or not, for each destination; and control means, responsive to input of dial information at time of call origination, for identifying the destination on the basis of said dial information, reading out information concerning whether notice of an identification number of a call originating party should be permitted or not, for the destination from said storage means, and sending dial information containing the information thus read out.

2. The communication apparatus according to claim 1, in which said storage means comprises a table for storing the information concerning whether notice of an identification number of a call originating party should be permitted or not, and an identification number, for each abbreviated dial number.

3. The communication apparatus according to claim 2, in which said table stores an identification number accompanied by the information concerning whether notice of an identification number of a call originating party should be permitted or not, for each abbreviated dial number, and said control means sends an identification number accompanied by the information concerning whether notice of an identification number of a call originating party should be permitted or not, read out from said table.

4. The communication apparatus according to claim 1, in which said storage means comprises a table for storing either a first special number indicating that notice of an identification number of a call originating party should be permitted to the destination, or a second special number indicating that notice of an identification number of a call originating party should not be permitted to the destination, and an identification number, and said control means sends out dial information containing an identification number accompanied by either said first special number or said second special number, read out from said table.

5. The communication apparatus according to claim 1, in which said storage means comprises a table for storing information concerning whether notice of an identification number of a call originating party should be permitted or not, for each identification number of destination.

6. The communication apparatus according to claim 1, in which said storage means comprises a table for storing either a first special number indicating that notice of an identification number of a call originating party should be permitted to the destination, or a second special number indicating that notice of an identification number of a call originating party should not be permitted to the destination, for each identification number of destination, and said control means sends out dial information containing an identification number of destination accompanied by either said first special number or said second special number, read out from said table.

7. A call originating method of a communication apparatus connected to a communication network having a function of noticing of an identification number of a call originating party to a called party, said call originating method comprising the following steps of:

reading out information concerning whether notice of an identification number of a call originating party should be permitted, on the basis of dial information at the time of call origination, from storage means for storing information concerning whether notice of an identification number of a call originating party should be permitted or not for each destination; and sending dial information containing the information thus read out.

8. A call originating method according to claim 7, in which said storage means comprises a first table for storing information concerning whether notice of an identification number of a call originating party should be permitted or not, and an identification number for each abbreviated dial number, and a second table for storing information concerning whether notice of an identification number of a call originating party should be permitted or not for each identification number of destination, and said reading out step determines whether dial information is an abbreviated dial number or an identification number of destination, and reads out information concerning whether notice of an identification number of a call originating party should be permitted or not, associated with the destination by referring to the first or second table on the basis of a result of the determination.

9. The call originating method according to claim 7, in which said storage means comprises a table for storing, for each abbreviated dial number, an identification number accompanied by either a first special number indicating that notice of an identification number of a call originating party should be permitted to the destination, or a second special number indicating that notice of an identification number of a call originating party should not be permitted to the destination, and said sending step sends out an identification number accompanied by either said first special number or said second special number, read out from said table.

10. The call originating method according to claim 7, in which said storage means comprises a table for storing, for each identification number of destination, either a first special number indicating that notice of an identification number of a call originating party should be permitted to the destination, or a second special number indicating that notice of an identification number of a call originating party should not be permitted to the destination, and said sending step sends out either said first special number or said second special number, read out from said table and the identification number.

11. A communication apparatus connected to a communication network having a function of noticing identification information of a call originating party to a destination terminal according to a desire of the call originating party, said communication apparatus comprising:

storage means for storing a special number indicating whether notice of an identification information of a call originating party is permitted or not, an identification number of destination, and an abbreviated dial number of destination, for each destination;

means for inputting dial information at time of call origination;

means for determining whether input information is an identification number or an abbreviated dial number of destination; and call originating means for reading out a special number from said storage means and sending the input information accompanied by the special number when said determining means has determined the input information to be an identification number of destination, and for reading out a special number and an identification number of destination from said storage means and sending the numbers thus read out to the communication network when said determining means has determined the input information to be an abbreviated dial number of destination.

12. The communication apparatus according to claim 11, in which said storage means comprises a first table for storing an identification number of destination accompanied by a special number, for each abbreviated dial number of destination, and a second table for storing a special number for each identification number of destination.

13. The communication apparatus according to claim 11, in which said communication apparatus is an extension terminal connected to a main apparatus having an exchange function connected to a trunk line, and said storage means is provided in the main apparatus for each extension terminal.

14. The communication apparatus according to claim 11, in which said call originating means has a first mode for sending an inputted identification number of destination as it is and a second mode for sending a number obtained by adding the special number to the input information to the communication network, and selectively executes either the first or second mode.

15. The communication apparatus according to claim 14, in which said call originating means executes the first mode when the inputted identification number of destination has a predetermined number at a head thereof.

16. The communication apparatus according to claim 11, in which if a call originating party desires identification information to be noticed in principle, said storage means stores a special number instructing identification information of the call originating party not to be noticed, an identification number of destination, and an abbreviated dial number of destination, for each destination whereat identification information of the call originating party should not be noticed.

17. The communication apparatus according to claim 11, in which if a call originating party desires identification information not to be noticed in principle, said storage means stores a special number instructing identification information of the call originating party to be noticed, an identification number of destination, and an abbreviated dial number of destination, for each destination whereat identification information of the call originating party should be noticed.

* * * * *